United States Patent [19]

Shimokura

[11] 4,337,850

[45] Jul. 6, 1982

[54] HYDRAULIC DAMPER

[75] Inventor: Akihiro Shimokura, Higashimine, Japan

[73] Assignee: Tokico Ltd., Kawasaki, Japan

[21] Appl. No.: 190,847

[22] Filed: Sep. 25, 1980

Related U.S. Application Data

[63] Continuation of Ser. No. 8,339, Jan. 31, 1979, abandoned.

[30] Foreign Application Priority Data

Feb. 6, 1978 [JP] Japan .......................... 53/13498[U]

[51] Int. Cl.³ .............................................. F16F 9/34
[52] U.S. Cl. .................................................. 188/319
[58] Field of Search ............... 188/285, 288, 319, 321; 74/528; 251/208, 209, 213

[56] References Cited

U.S. PATENT DOCUMENTS

| 1,296,835 | 3/1919 | Monsen | 188/196 M X |
| 2,347,803 | 5/1944 | Allen et al. | 188/319 X |
| 4,220,228 | 9/1980 | Kato | 188/319 |

FOREIGN PATENT DOCUMENTS 565630 11/1944 United Kingdom ................ 188/319

*Primary Examiner*—Duane A. Reger

*Attorney, Agent, or Firm*—Wenderoth, Lind & Ponack

[57] ABSTRACT

A hydraulic damper includes a cylinder containing oil therein, a hollow piston rod one end of which projecting out of the cylinder and the other end of which extends into the cylinder, a piston provided on the inner end of the piston rod and dividing the interior of the cylinder into two oil chambers, a connecting passage including the interior of the hollow piston rod and placing the two oil chambers in communication, a rod member rotatably extending through the hollow piston rod and projecting out of the cylinder, a valve mechanism connected to the inner end of the rod member for changing the effective area of the connecting passage and having a predetermined range of rotational movement for changing the effective area of the connecting passage, an adjusting element receiving member detachably connected to the outer end of the piston rod, an adjusting element mounted on the adjusting element receiving member and being rotatable and axially displaceable relative thereto, the inner end of the adjusting element being adapted to non-rotatably engage with the outer end of the rod member, and a lock member provided between the adjusting element and the adjusting element receiving member for controlling the relative rotation therebetween.

3 Claims, 5 Drawing Figures

HYDRAULIC DAMPER

This application is a continuation of application Ser. No. 008,339, filed Jan. 31, 1979, now abandoned.

BACKGROUND OF THE INVENTION

The present invention relates to a hydraulic damper and, particularly, to hydraulic dampers of the type wherein the resisting force can be adjusted from the outside of the dampers.

One of the prior art hydraulic dampers of this type comprises a cylinder containing oil therein, a piston rod one end of which projects out of the cylinder and the other end of which extends into the cylinder, a piston connected to the inner end of the piston rod and dividing the interior of the cylinder into two chambers, a connecting passage connecting the two chambers in the cylinder with each other through a hollow portion formed in the piston rod, a rod member rotatably disposed in the hollow portion of the piston rod, a valve mechanism connected to the inner end of the rod member for changing the opening of the connecting passage, and an adjustor connected to the outer end of the rod member for rotating the same.

The opening of the connecting passage acting as a part of the valve mechanism has usually been formed as one or more orifices formed in the piston rod, so that there is the shortcoming that the range of adjustment is relatively narrow since the effective area of the orifices cannot be increased very much because of the limitation in the diameter of the piston rod and of the hollow configuration.

Moreover, there is a further shortcoming such that it is difficult to know the respective adjusted conditions from the outside and it is necessary to provide a device for indicating the respective adjusted conditions since the rod member of the known hydraulic damper is adapted to rotate through 360 degrees, and it has been difficult to cause the relative angular position of the adjustor and the rod member to coincide in connecting the adjustor and the rod member.

SUMMARY OF THE INVENTION

An object of the present invention is to provide a hydraulic damper eliminating the shortcomings aforementioned, and the hydraulic damper comprises a cylinder containing oil therein, a hollow piston rod one end of which projects out of the cylinder and the other end of which extends into the cylinder, a piston provided on the inner end of the piston rod and dividing the interior of the cylinder into two oil chambers, a connecting passage including the interior of the hollow piston rod and connecting the two oil chambers, a rod member rotatably extending through the hollow piston rod and projecting out of the cylinder, a valve mechanism connected to the inner end of the rod member for changing the effective area of the connecting passage and having a predetermined range of rotational movement for changing the effective area of the connecting passage, an adjusting element receiving member detachably connected to the outer end of the piston rod, an adjusting element mounted on the adjusting element receiving member and being rotatably and axially displaceable relative thereto, the inner end of the adjusting element being adapted to non-rotatably engage with the outer end of the rod member, and a lock member provided between the adjusting element and the adjusting element receiving member for controlling the relative rotation therebetween.

Preferably, a non-circular recess is formed in the inner end of the adjusting element for engaging with a correspondingly shaped outer end of the rod member so that the adjusting element can be non-rotatably connected with the rod member for connecting the adjusting element receiving member with the piston rod.

BRIEF DESCRIPTION OF THE DRAWINGS

The present invention may be better understood from the following description with reference to the drawings wherein.

DETAILED DESCRIPTION OF THE EMBODIMENTS

Figure 1:
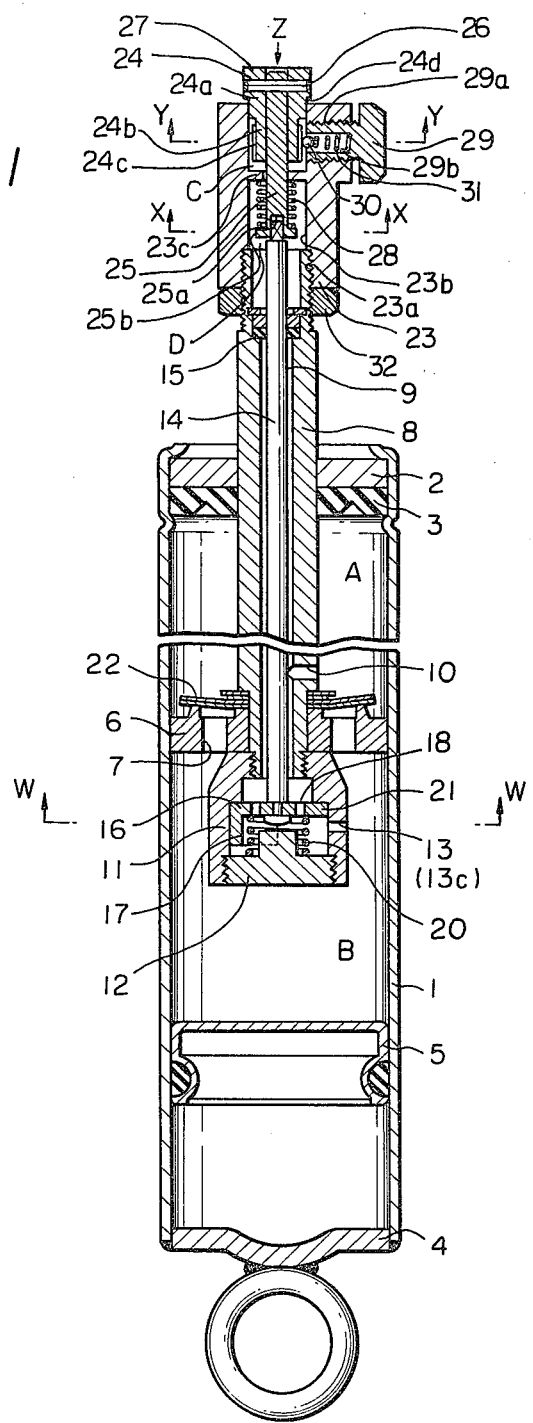
FIG. 1 is a longitudinal section of a hydraulic damper according to the present invention.

The hydraulic damper shown in FIG. 1 comprises a cylinder 1 one end of which is closed by a rod guide 2 and a seal ring 3 and the other end of which is closed by a cap 4. In the interior of the cylinder 1 there is received gas and oil which are separated by a free piston 5.

A piston 6 is slidably fitted in the oil receiving portion of the cylinder 1 and partitions the oil receiving portion of the cylinder 1 into two oil chambers A and B. A passage 7 is formed in the piston 6 for connecting the chambers A and B.

A piston rod 8, which has a hollow bore 9 extending through the overall length in the axial direction, extends from one side or the upper side of the piston 6, through the oil chamber A, slidingly and oil-tightly through the rod guide 2 and the seal ring 3, and to the outside of the cylinder 1. An opening 10 is formed in the piston rod 8 at a position adjacent to the piston 6 for connecting the hollow portion or the bore 9 with the oil chamber A.

A tubular member 11 is mounted on the other or the lower side of the piston 6 and projects into the chamber B and, in the embodiment, the member 11 acts also as a nut connecting the piston 6 with the piston rod 8. The interior of the tubular member 11 is connected with the hollow portion 9 of the piston rod 8 at the end adjacent to the piston 6 and, the other or the lower end thereof is closed by a plug 12. The tubular member 11 has a plurality of orifices 13a, 13b, 13c, . . . 13n (depicted by a numeral 13 as a whole) which connect the interior of the tubular member 11 with the oil chamber B.

Thus, the hollow portion 9 of the piston rod 8, the opening 10, the interior of the tubular member 11, and the orifices 13a, 13b . . . 13n constitute a connecting passage placing the chambers A and B in communication. The orifices 13a, 13b . . . 13n form a part of the connecting passage.

A rod member 14 is rotatably received in the hollow portion 9 of the piston rod 8 and has a shape such that it does not close the connecting passage and, the upper end of the rod member 14 extends in oiltight relation through a seal ring 15 to the outside of the hollow portion 9 of the piston rod 8 and the lower end thereof extends into the tubular member 11.

A valve body 16 is rotatably received in the tubular member 11 and is rigidly connected to the lower end of the rod member 14. The valve body 16 has a generally cup-shaped configuration with the cylindrical side wall being cut off through a semi-circle. The remaining side wall constitutes a valve portion 17 and cooperates with the orifices 13a, 13b . . . 13n. A plurality of openings 18 are formed in the bottom portion of the cup to act as a portion of the connecting passage.

A stop 19 is mounted on the tubular member 11 and is engageable with the circumferential end surfaces 17a and 17b of the valve portion 17 of the valve body 16, thus restricting the range of the rotational movement of the valve body 16 or the rod member 14 within an angle of 180°. As clearly shown in FIG. 2, when one of the end surfaces 17a engages with the stop 19 the valve portion 17 leaves all of the orifices 13a, 13b, 13c, . . . and 13n uncovered, and when the valve portion 17 is rotated in the counter clockwise direction in FIG. 2 the orifices 13a, 13b, . . . will be sequentially closed. And when the other end surface 17b engages with the stop 19, the valve portion 17 closes all of the orifices 13a, 13b, . . . 13n.

A spring 20 extends between the plug 12 and the valve body 16 for biasing the valve body 16 against a shoulder portion 21 thus maintaining a predetermined relative position of the piston rod 8 and the tubular member 11 with respect to the rod member 14 and the valve body 16 in the axial direction.

A valve disc 22 of the well-known type is mounted on the piston 6 and operates such that when the piston 6 reciprocatingly moves in the cylinder 1 and the pressure in the chamber A or B exceeds a predetermined level, the disc 22 deflects and the chambers A and B are placed in communication with one another through the passage 7, so that the valve disc 22 constitutes a part of a resisting force generating mechanism of the hydraulic damper.

As described heretofore, the opening of the orifices 13 or the effective area of the connecting passage can easily be adjusted by rotating the rod 14 from the outside of the damper, whereby the resisting force generating in the hydraulic damper can be adjusted since the oil flowing through the orifices 13 or the connecting passage generates some amount of resisting force and the oil flowing across the valve disc 22 correspondingly changes.

An adjusting element receiving member 23 is detachably and screw-threadingly connected to the outer end of the piston rod 8 which is threaded into a threaded bore 23a of the member 23. The member 23 has an axially extending bore 23b therethrough and the interior thereof is divided into two chambers C and D by an annular wall 23c formed midway of the bore 23b.

There is provided an adjusting knob 24 which consists of a knob portion 24a having a diameter larger than that of the bore 23b, and a fitting portion 24b having a diameter smaller than that of the bore 23b and being received in the chamber C. A plurality of recessed portions 24c extending respectively in the axial direction are formed in the outer circumferential surface of the fitting portion 24b, and the angular positions of the recessed portions 24c correspond to that of the orifices 13a, 13b . . . 13n.

A connecting rod 25 is secured to the adjusting knob 24 by a pin 26 and the lower or the inner end of the rod 25 extends into the chamber D and is non-rotatably connected to the outer end of the rod member 14 by means of a projection-and-recess engagement.

Figure 3:
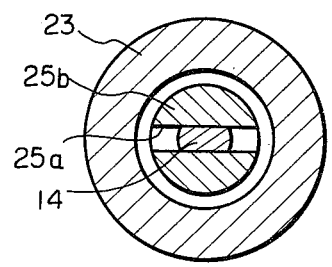
FIG. 3 is a cross-section taken along line X—X in FIG. 1.

As clearly shown in FIG. 3, the outer end of the rod member 14 is shaped so as to have two opposite flat surfaces by a machining operation or the like and, a slot 25a adapted to receive the shaped portion of the rod member 14 is formed in the inner end of the connecting rod 25, so that the actuating rod 14 is non-rotatably engaged with the connecting rod 25. But relative axial displacement between the member 14 and the connecting rod 25 is permitted. It will be noted that the configuration or the cross-section of the outer end of the rod member 14 and the inner end of the connecting rod 25 is not limited to the configuration of FIG. 3, and it may have any desired non-circular form. The adjusting knob 24 and the connecting rod 25 connected thereto constitute an adjusting element 27 according to the present invention.

A spring 28 is interposed between the annular wall 23c and a flange 25b formed on the lower end of the connecting rod 25 for biasing the adjusting element 27 toward the rod member 14, whereby the engagement between the connecting rod 25 and the rod member 14 is reliably maintained.

A bolt 29 is screw-threadingly engaged with the adjusting element receiving member 23 by screw-threads 29a and has a bore 29b extending in the direction of the axis thereof.

Figure 4:
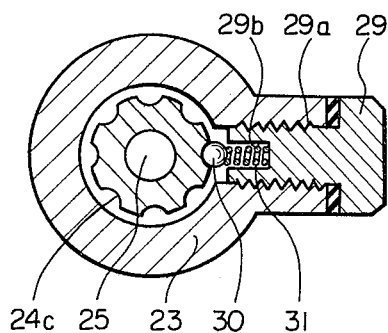
FIG. 4 is a cross-section taken along line Y—Y in FIG. 1.

A ball 30 engages, as clearly shown in FIG. 4, with one of the recessed portions 24c of the adjusting element 27.

A spring 31 is disposed in the bore 29b and acts between the bolt 29 and the ball 30 to bias the ball 30 against the adjusting element 27.

Thus, the recessed portion 24c, the bolt 29 the ball 30 and the spring 31 constitute a locking mechanism which prevents adjusting element 27 from the displacement when the adjusting element 27 has been rotated to a desired position relative to the member 23.

A lock nut 32 secures the adjusting element receiving member 23 on the piston rod 8.

Figure 5:
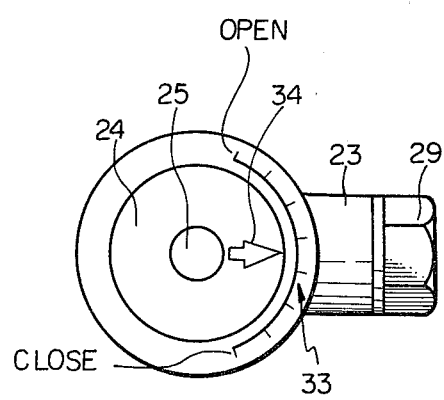
FIG. 5 is a view as viewed in the direction of arrow Z in FIG. 1.

As shown in FIG. 5, the adjusting element receiving member 23 has a scale 33 having angular indicia corresponding to the respective orifices 13a, 13b . . . 13n, and the adjusting knob 24 of the adjusting element 27 has an arrow mark 34 for cooperating with the scale 33.

The operation of the hydraulic damper of the present invention will be explained hereinafter.

Firstly, a description will be given with respect to the operation for adjusting the indication on the adjusting element and the opening of the valve mechanism.

In screw-threadingly connecting the adjusting element receiving member 23 with the piston rod 8, the adjusting element 27 integrally rotates with the adjusting element receiving member 23 at the initial stage of the connection since the stepped portion 24d abuts against the upper end surface of the adjusting element receiving member 23 due to the biasing force of the spring 28, and the adjusting element 27 is connected with the adjusting element receiving member 23 through the locking mechanism.

Then, the inner end of the connecting rod 25 abuts the outer end of the rod member 14. Upon further rotating the member 23 with respect to the piston rod 8, the flat surface portion of the rod member 14 engages with the slot 25a of the connecting rod 25 whereby the adjusting element is non-rotatably connected to the valve mechanism.

Figure 2:
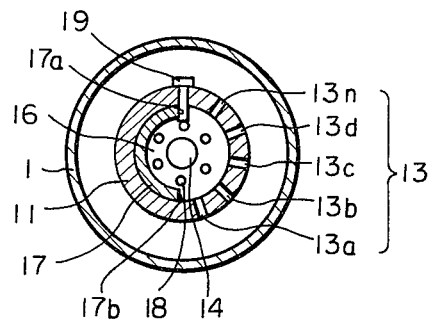
FIG. 2 is a cross-section taken along line W—W in FIG. 1.

Assuming that the valve portion 17 is in the position of FIG. 2 at that time, and the adjusting element receiving member 23 is rotating in the counter clockwise direction as viewed in FIG. 2 in the connecting operation, then, the adjusting element 23, the adjusting element receiving member 27 and the rod member 14 integrally rotate until the end surface 17b of the valve portion 17 engages with the stop 19 (the fully closed condition of the orifice 13).

When the valve portion 17 abuts the stop 19, the rotation of the rod member 14 and the adjusting element 27 is blocked, but the adjusting element receiving member 23 is further rotated with the ball 30 of the locking mechanism passing over the successive recessed portions 24c.

Thereafter, the fully closed position of the scale 33 on the adjusting element receiving member 23 is aligned with the arrow mark 34 on the adjusting element 27, and the adjusting element receiving member 23 is secured to the piston rod 8 by means of the lock nut 32.

As described heretofore, in the hydraulic damper according to the present invention, the valve body 16 can not rotate through 360 degrees by means of the stop 19 and a cut-out portion formed in the valve body 16, and the range of the rotation is limited to a predetermined angle, and the indication on the adjusting element can easily and reliably be adjusted to correspond with the opening of the valve mechanism irrespective of the initial position of the valve member 16 when connecting the adjusting element receiving member 23 with the piston rod 8.

The resisting force of the damper can thereafter be adjusted by positioning the arrow mark 34 on the adjusting element 27 at a suitable position of the scale 33.

The locking mechanism prevents the relative displacement between the adjusting element receiving member 23 and the adjusting knob 24 after the adjustment, so that a desired resisting force can reliably be generated not withstanding vibrations of the vehicle, oil flow in the hydraulic damper or the like which would otherwise displace or shift the adjusted position.

The present invention may include the following embodiments, wherein:

(a) The orifices 13 and the stop 19 are formed on the piston rod 8, and the valve member 16 connected with the rod member 14 is disposed in the hollow portion 9 of the piston rod 8 to open or close the orifices 13.

(b) The rod member 14 and the valve member 16 are connected indirectly through a cylindrical cam or the like, and the orifices 13a, . . . are arranged in the direction of the axis of the tubular member so that when the rod member 14 is rotated the valve member 15 is moved in the axial direction thereby opening or closing the orifice 13.

(c) The orifices 13 are formed of a circumferentially extending slot thereby enabling continuous adjustment.

I claim:

1. A hydraulic damper comprising a cylinder containing oil therein, a hollow piston rod one end of which projects out of the cylinder and the other end of which extends into the cylinder, a piston provided on the inner end of the piston rod and dividing the interior of the cylinder into two oil chambers, a connecting passage including the interior of the hollow piston rod and placing the two oil chambers in communication, a rod member rotatably extending through the hollow piston rod and projecting out of the cylinder, a valve mechanism on the inner end of the rod member for changing the effective area of the connecting passage and consisting of a first member secured to said rod and a second member secured to said piston, said first member being slidable on said second member during rotation of said rod member, one of said first and second members having a plurality of orifices spaced therearound and the other of said first and second members successively covering said orifices during rotation of said rod member in one direction and successively uncovering said orifices during rotation in the other direction, an adjusting element receiving member detachably connected to the other end of the piston rod, and adjusting element mounted on the adjusting element receiving member and being rotatable and axially displaceable relative thereto, the inner end of the adjusting element being adapted to non-rotatably engage with the outer end of the rod member, said adjusting member having a plurality of axially extending grooves in the outer circumferential surface thereof corresponding in number and position to said orifices, and a spring biased lock element mounted on the adjusting element receiving member and resiliently engaging in respective ones of said grooves for normally holding said adjusting element against rotation due to vibration and the like and permitting incremental rotation for uncovering or covering one of said orifices when said adjusting element is rotated to move said lock element out of one groove into a next adjacent groove for adjustment of the effective area of said connecting passage.

2. A hydraulic damper as claimed in claim 1 wherein said valve mechanism is rotatable only within an angle of 180 degrees.

3. A hydraulic damper as claimed in claim 1 further comprising means for indicating the degree of opening of the valve mechanism on the adjusting element and the adjusting element receiving member by indicating the amount of relative rotation therebetween.

* * * * *